United States Patent

[11] 3,540,568

[72] Inventor Oskar Wellauer
Wiesenstrasse 27, Kusnacht, Zurich, Switzerland
[21] Appl. No. 738,047
[22] Filed June 18, 1968
[45] Patented Nov. 17, 1970
[32] Priority June 22, 1967
[33] Austria
[31] No. A5804/67

[54] APPARATUS FOR TURNING AND ALIGNING OF WORKPIECES
3 Claims, 2 Drawing Figs.

[52] U.S. Cl. .................................................. 198/33
[51] Int. Cl. .................................................. B65g 47/24
[50] Field of Search ....................................... 198/33(R2), 103, 34; 214/1R

[56] References Cited
UNITED STATES PATENTS
2,709,513  5/1955  Weber .......................... 198/33(R2)UX

*Primary Examiner*—Edward A. Sroka
*Attorney*—Kemon, Palmer and Estabrook

ABSTRACT: Apparatus for turning and aligning of workpieces, particularly for incorporation into a production line including wood working machines for working wooden panels along the side edges thereof comprises a conveyer track formed by two successively arranged belt conveyer sections, a turning device arranged at one side of the conveyer track and provided with stop members and with clamping means for the workpieces fed by one of the conveyer sections to the turning devices to be rotated through 90° and then moved along in aligned position by the other conveyer section.

APPARATUS FOR TURNING AND ALIGNING OF WORKPIECES

The present invention relates to apparatus for turning and aligning of workpieces of the kind comprising a conveyer track, a turning device cooperating with the conveyer track and stop members for the work pieces.

The apparatus is particularly intended to form a portion of a production line, i.e. the portion of a production line between two operating stations, between which a workpiece must be turned through 90°.

A particular field of application of the apparatus according to the invention is a production line including wood-working machines on which wood panels and the like shall be worked for example on all four edges.

Known production lines of this kind are not equipped with turning devices. Nevertheless, in order to work the continuously travelling wood panels on several sides, the conveyer tracks have been arranged along an angular path. An important disadvantage of such arrangements is the required considerable space, not to mention that a non rectilinear production line does not permit an economical operation. Furthermore, such non linear production lines require special workpiece alignment means which, if they are to operate in reliable manner, are extremely complicated.

In existing apparatus for turning of workpieces the turning device was always located in the middle of the conveyer track. In such an arrangement the exact alignment of the workpieces was a difficult problem and required complicated equipment.

It is an object of the present invention to provide apparatus for turning and aligning of workpieces which avoids the inconveniences of known apparatus.

In the apparatus according to the invention comprising a conveyer track, a turning device cooperating with the track and stop members for the workpieces, the turning device is arranged laterally on the conveyer track.

This simple disposition permits the establishment of rectilinear production lines on which the workpieces are guided along a laterally extending line and can be aligned on this line.

The turning device conveniently is formed as a rotary plate with a clamping mechanism for the workpieces. The stops preferably are fixed to the turntable and are adjustable in longitudinal direction.

The apparatus may be automatically operated by means of suitably positioned switches.

An embodiment of the apparatus according to the invention is illustrated in the accompanying drawings.

Figure 1:
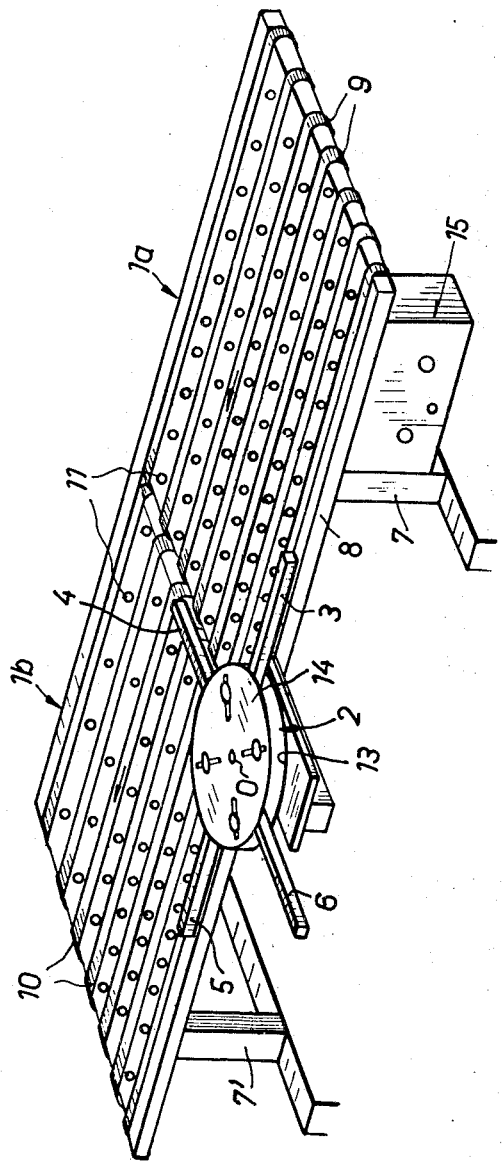
FIG. 1 is a perspective view of apparatus for turning and aligning workpieces suitable for incorporation in a production line comprising wood working machines.

The apparatus for turning and aligning workpieces, for example wood panels, shown in FIG. 1, comprises essentialy a two-piece conveyer track 1a, 1b and a turning device 2 having stops 3, 4, 5 and 6.

The two parts 1a, 1b of the conveyer track are disposed in a frame 8 supported on the floor by legs 7, and comprise a plurality of belts 9 and 10, respectively, disposed side by side and driven in the direction of the marked arrow, as well as a plurality of rolls or balls 10 arranged on different radii around the centre 0 of the turning device 2.

For transporting a workpiece in the direction of the arrow, this piece is supported by the belts 9 or 10 without touching the rolls 11. If, however, a workpiece has to be turned, the continuously travelling belts 9 and 10 are lowered until the workpiece comes to rest on the rolls 11.

The turning device 2 comprises a lower rotary plate 13 on which the stop arms 3, 4, 5 and 6 are radially mounted at a 90° displacement, and an upper plate 14 which may reciprocate relative to the lower plate vertically along the rotation axis of the plates 13, 14. When a workpiece moving along the conveyer track abuts against the stop arms 3 and 4, the plate 14 which is sufficiently spaced above the plate 13 is moved downwardly until the workpiece will be firmly clamped between the two plates. Then the turning device 2 is rotated through 90°, conveniently by means of a step by step mechanism or indexing switch, then the plate 14 automatically moves upwards again and releases the clamping, whereafter the belts 10 of the conveyer track portion 1b driven in the direction of the arrow, are lifted, the workpiece which is exactly aligned, is transported further on and arrives at the next following operating station.

The arms 3, 4, 5 and 6 are telescoped, i.e. their length can be adjusted in order to serve as efficient stops for workpieces of all sizes.

The operation of the apparatus is effected by several electromotors (not shown), all operating cycles being exactly synchronized. The clamping device for the workpieces (plates 13 and 14) may be hydraulically operated, but also an electromagnetic drive is possible.

Figure 2:
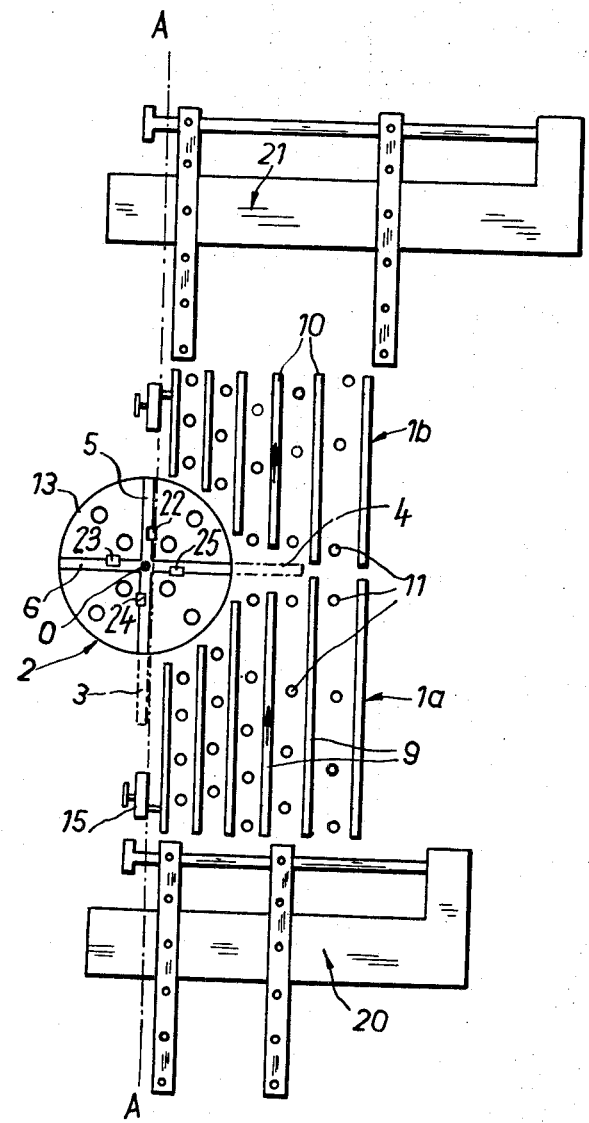
FIG. 2 is a plan view on the apparatus according to FIG. 1, incorporated between two machines for working the side edges of a wood panel.

FIG. 2 shows diagrammatically in plan view an apparatus according to FIG. 1 incorporated between two operating stations 20 and 21 of a production line. The upper plate 14, i.e. the clamping plate has been omitted for the purpose of clearness.

Due to the lateral disposition of the turning device 2, the workpieces can be aligned in a simple manner.

The described apparatus operates as follows: It is supposed that a workpiece in the form of a plate to be worked on all sides is discharged by the operating station 20, for example a milling machine and arrives on the conveyer track 1a. The workpiece will be advanced by means of the conveyer belts 9 driven continuously in the direction of the arrow and will abut against the stops 3 and 4. Upon arrival on the stop 4, a limit switch 25 is actuated and releases the following operations:

a. the continuously moving belts 9 and 10 are lowered and the workpiece comes to rest on the balls or rolls 11, b. approximatively at the same time the plate 14 is moved downwardly and clamps the workpiece between itself and the plate 13, c. the turning device is indexed through 90° by observing a suitable retardation time, d. after rotation of the workpiece through 90° the clamping action is automatically eliminated, i.e. the plate 14 moves upwardly and the belts 9 and 10 are again lifted and move the workpiece further on or feed a new workpiece towards the turning device.

In order to enable optimum operating conditions for the turning device, the conveyer belts can be put in operative position already during the progress of the rotating movement of the workpiece by means of the device 2.

Obviously, also the stop arms 5, 6 and 3 are equipped with control switches 22, 23, 24 and 25.

The described apparatus permits transportation of a workpiece from one machine 20 to a second machine 21, to turn the workpiece through 90° between these stations and to have it always aligned with a A—A (extension of the stop arms 3 and 5, for example).

The individual elements of the apparatus are well known to the expert and do not require further explanation.

The clamping device can be provided with the turning table 13 only which can be equipped with suction elements connected to a vacuum pump in order to retain the workpieces during rotation.

Instead of using telescopic stop arms, the stops for the workpiece can be formed by elements of relatively small length fixed to the plate 13, to which elements extensions can be attached. The stop members also can be interchangeable.

The position of the turning device 2 or its centre can be made adjustable in a direction transverse or oblique to the travelling direction of the conveyer track.

I claim:

1. Apparatus for turning and aligning of workpieces, comprising a conveyor track having a straight side edge, a turning device cooperating with said conveyor track, and stop members for workpieces mounted on the turning device, said turning device being arranged laterally on the conveyor track for stepwise rotation through four 90° steps about a vertical axis, said stop members being formed by straight arms extending radially from the center of the turning device and being angularly spaced 90° to one another, two of said arms, in each rest position of the turning device, being aligned substantially with the side edge of the conveyor track on which the turning device is mounted, and another of said arms, in the same position of the turning device, extending at right angles with respect to said side edge over at least part of said conveyor track.

2. Apparatus according to claim 1 in which said turning device comprises a circular table that rotates about said vertical axis and a circular clamping plate arranged above said table for rotation about said vertical axis, said clamping plate being capable of reciprocation vertically along said vertical axis for movement toward and away from said table.

3. Apparatus according to claim 1 in which said straight arms carry electrical control switches which are actuated by contact with workpieces to control operations of said apparatus.